United States Patent [19]

Cole

[11] Patent Number: 5,080,189

[45] Date of Patent: Jan. 14, 1992

[54] ELECTRO-HYDRAULIC DIPOLE VIBRATOR

[75] Inventor: Jack H. Cole, Ponca City, Okla.

[73] Assignee: Conoco Inc., Ponca City, Okla.

[21] Appl. No.: 682,799

[22] Filed: Apr. 8, 1991

[51] Int. Cl.⁵ ............................................. G01J 1/40
[52] U.S. Cl. .................................. 181/106; 181/104; 367/75
[58] Field of Search ................... 181/104, 106, 113; 367/75, 143, 189

[56] References Cited

U.S. PATENT DOCUMENTS

| | | | |
|---|---|---|---|
| 3,221,833 | 12/1965 | Malmberg | 181/106 |
| 3,382,841 | 5/1968 | Bouyoucos | 116/137 A |
| 3,384,868 | 5/1968 | Brown et al. | 367/143 |
| 4,049,077 | 9/1977 | Mifsud | 181/114 |
| 4,147,228 | 4/1979 | Bouyoucos | 181/119 |
| 4,383,591 | 5/1983 | Ogura | 181/106 |
| 4,483,411 | 11/1984 | Mifsud | 181/120 |
| 4,578,784 | 3/1986 | Mifsud | 367/143 |
| 4,649,525 | 3/1987 | Angona et al. | 367/31 |
| 4,862,990 | 9/1989 | Cole | 181/106 |

Primary Examiner—Ian J. Lobo

[57] ABSTRACT

A downhole seismic shear wave source is used to generate seismic shear waves a downhole environment. At least one double headed piston rod with a third piston on the center of the rod slides laterally in the downhole tool. Each end piston head is connected to a rolling diaphragm that is secured at its edges around the periphery of the piston receiving cavity. The cavity is filled with a low viscosity non-conducting oil. A servovalve is connected to opposite sides of the center piston head to produce low frequency vibration of the source generator. A veed target rod extends between the end piston heads, past a pair of eddy current transducers (ECTs) to monitor movement of the generator and provide feedback control to the servovalve. A second downhole seismic shear wave source contains a continuous vibrator ring replaces the diaphragm/oil system and a linear variable differential transformer (LVDT) replaces the eddy current transducers as the feedback signal generator.

9 Claims, 2 Drawing Sheets

ELECTRO-HYDRAULIC DIPOLE VIBRATOR

BACKGROUND OF THE INVENTION

1. Field of the Invention

The present invention pertains to downhole dipole seismic sources and more particularly to downhole seismic sources used to generate seismic shear waves.

2. Related Prior Art

It has been adequately demonstrated that dipole sources are capable of injecting detectable shear waves into formations surrounding liquid-filled boreholes. Foreign technology has produced a model tool, while two domestic corporations have reported successful experimental tools using dipole sources.

These three dipole source concepts mentioned above all use piezoelectric transducers, which generate relatively weak signals at frequencies of 4000 Hz and above. All three tools produce short bursts of energy and measure travel times between spaced receivers to determine formation shear wave velocities.

For example, U.S. Pat. No. 4,649,525 titled "Shear Wave Acoustic Logging System" (Angona et al.) describes a dipole source employing a piezoelectric bender type transducer as a point source of an acoustic shear wave. The bender type transducer described includes opposed unrestricted planar surfaces mounted within a liquid filled compartment within a logging tool. The unrestricted surfaces of the transducer are spaced longitudinally along the axis of the tool and exposed to the coupling liquid. One or more bender type transducers may be employed as acoustic receivers in these tools. The active surfaces of the receivers are oriented in substantially the same direction as the active surfaces of the transmitting transducer. U.S. Pat. No. 3,382,841, "Flexural Disc Transducer" (Bouyoucos), relates to a sound generator embodying the invention which makes use of a flexural disc radiating element which provides large acoustic power handling capability without the use of piston or thin spherical shaped wall members. This flexural disc radiating element also provides an acoustic transformer for transferring acoustic energy from a relatively small cross-sectional area to a relatively large cross-sectional area so that the impedances of an acoustic energy source and a load can be matched to each other.

Additional United States patents which illustrate the state of the art in dipole sources are as follows. These patents relate to hydraulic type acoustic wave generators.

U.S. Pat. No. 4,049,077, "Seismic Vibrator Control System", (Mifsud), relates to a control system for a hydraulic vibrator that permits the injection into the ground of seismic signals having pseudo-random code patterns or other broad band signals. Feedback for controlling vibrator operation is taken from the coupling plate. At low frequencies, the feedback is proportional to coupling plate position and at higher frequencies, the feedback is proportional to the coupling plate velocity.

U.S. Pat. No. 3,384,868, "Marine Vibrator Device", (Brown, et. al), relates to an apparatus for the generation of seismic energy waves within a water medium which consists of a rigid frame member and suspension attachments, the frame member movably securing a piston plate between upper and lower sealed bellows which are alternately pressurized by reciprocal oil flow to vibrate the piston plate relative to the frame member. The apparatus also includes an additional bellows which is sealed between the piston plate and frame member to receive varying air pressure to thereby maintain static pressure balance.

U.S. Pat. No. 4,147,228, "Methods and Apparatus for the Generation and Transmission of Seismic Signals", (Bouyoucos), relates to an apparatus for generating and transmitting seismic signals for the purpose of seismic exploration. The signals are force pulses shaped to have a spectrum constrained to the range of frequencies which are necessary for penetration to desired depths within the earth and for resolution of the geological reflection surfaces therein. These pulses are provided in a non-repetitive or aperiodic train, constructed to produce a transmitted energy spectrum whose mean energy extends smoothly at a substantially constant level over the spectrum frequency range, notwithstanding that the repetition frequency of the pulses may be swept over a frequency band much narrower than the spectrum range. The transmitted spectrum can exhibit an auto-correlation function having a major lobe which is predominant over any side lobes, corresponding to a desired level of resolution of the geological reflection surfaces.

U.S. Pat. No. 4,383,591, "Apparatus for Generating P Waves and S Waves", (Ogura), relates to an apparatus for generating P waves and S waves in a ground formation for a geological survey and the like. The apparatus has a percussive device which is driven to abruptly increase water pressure within a bore hole of the ground formation.

U.S. Pat. No. 4,483,411, "Tunable Marine Seismic Source", (Mifsud), relates to a marine seismic source which produces a varying FM signal in the low end of the acoustic spectrum. The seismic source uses stiff oscillating radiators to create a signal in the water. These radiators are attached to devices acting as springs with a variable spring rate. Variation of the spring rate as a function of the frequency permits the device to be tuned for maximum power output.

U.S. Pat. No. 4,578,784, "Tunable Marine Seismic Source", (Mifsud), relates to a device which is a marine seismic source which produces a varying FM signal approximately in the 10-100 Hertz region of the spectrum. The seismic source uses stiff oscillating radiators to create a signal in the water. These radiators are actuated by hydraulic cylinders which are in hydraulic communication with hydraulic or oleopneumatic variable devices acting as springs with a variable spring rate. Variation of the spring rate as a function of the frequency permits the device to be tuned for maximum power output.

U.S. Pat. No. 3,221,833, "Geophysical Borehole Apparatus", (Malmberg), relates to an apparatus for generating seismic waves. Geophysical prospecting is a technique employed to determine the subsurface structure of the earth, such as the geometry of sedimentary strata. This information is a valuable guide to the location of natural resource deposits, such as ore deposits, petroleum deposits, etc. The technique comprises the transmitting of vibratory energy into the earth and recording and interpreting the vibrations that return to the surface after reflection from, or refraction along, boundaries between geophysical formations.

While prior art has illustrated many devices for generating acoustic type seismic waves in a fluid environment, none have demonstrated the reliable generation of seismic shear waves in a frequency range close to surface vibrators.

SUMMARY OF THE INVENTION

The present invention is directed to a downhole seismic shear wave source suitable for use with well logging, cross well seismic measurements and reverse seismic profiles. A double headed piston rod with a third piston on the center of the rod slides laterally in the downhole tool. Each end piston head is connected to a rolling diaphragm that is secured at its edges around the periphery of the piston-receiving cavity. The cavity is filled with a low-viscosity non-conducting oil. A servovalve is connected to opposite sides of the center piston head to produce low frequency vibration of the source generator. A veed target rod extends between the end piston heads, past a pair of eddy current transducers (ECTs) to monitor movement of the generator and provide feedback control to the servovalve.

In a second embodiment, a continuous vibrator ring replaces the diaphragm with oil system and a linear variable differential transformer (LVDT) replaces the eddy current transducers as the feedback signal generator.

DESCRIPTION OF THE PREFERRED EMBODIMENT

Referring now to the attached figures, the present invention is illustrated in two embodiments, both of which are capable of generating downhole seismic shear waves in frequencies compatible with surface seismic wave generators. The concepts disclosed by the present invention are intended to operate at frequencies closer to those of surface vibrators (10 Hz to 500 Hz) and would produce much larger amplitude disturbances. The present invention is a mechanical apparatus that eliminates problems often occurring in seismic shear wave generators that are used in a wellbore or borehole. Many of the prior art shear wave generators that are designed for downhole use are electronic in nature and cannot be used to generate low frequency shear waves or, if low frequencies are generated, the amplitude is extremely small and the source becomes much less effective.

Figure 1:
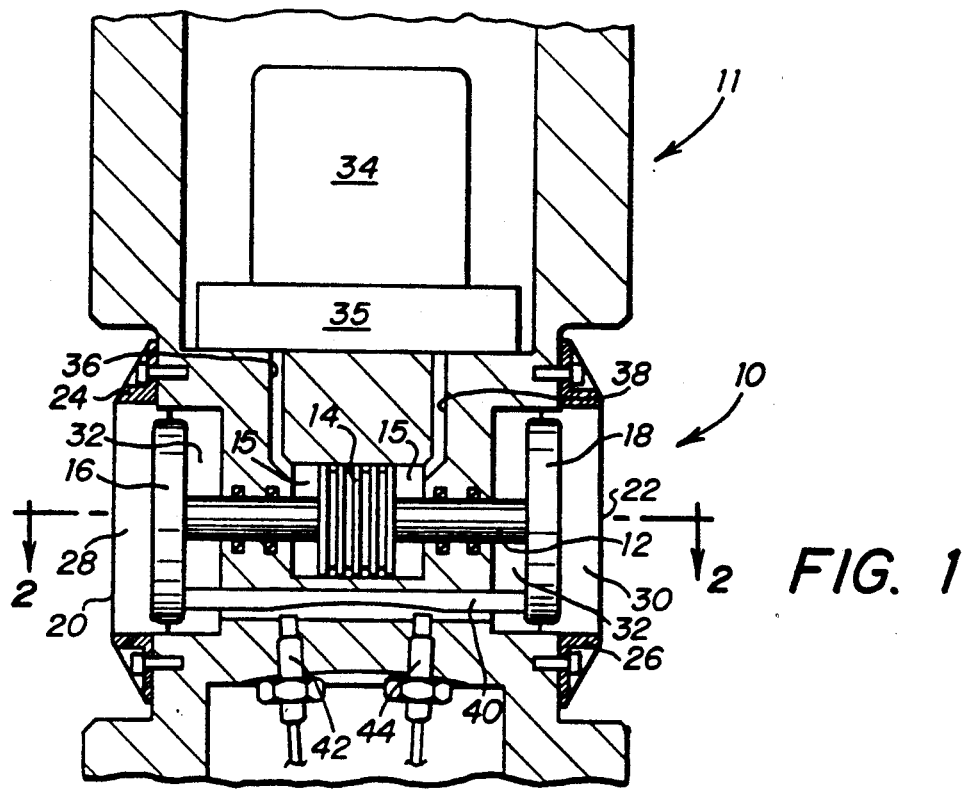
FIG. 1 is a sectional view of a first embodiment of a seismic shear wave generator having a piston and rolling diaphragm assembly as the vibrating dipole element.

As illustrated in FIG. 1, the present invention is directed to a downhole seismic shear wave source generator 10 as part of a downhole tool 11. A double headed piston rod 12 with a third center piston 14 in a center cavity 15 on the center of rod 12 slides laterally in a downhole tool 11. Each end piston head 16 and 18 is in contact with rolling diaphragms 20 and 22 that are secured at their edges by retaining rings 24 and 26 around the periphery of the piston receiving cavities 28 and 30, respectively. Behind piston heads 16 and 18, cavities 28 and 30 are filled with a low viscosity non-conducting oil 32. A servovalve 34 is connected to opposite sides of piston 14 through manifold 35 and flow passages 36 and 38 to produce low frequency vibration of shear wave source generator 10. A veed target rod 40 extends between end piston heads 16 and 18, past a pair of eddy current transducers 42 and 44 to monitor movement of rolling diaphragms 20 and 22 and to provide feedback control to servovalve 34.

Figure 2:
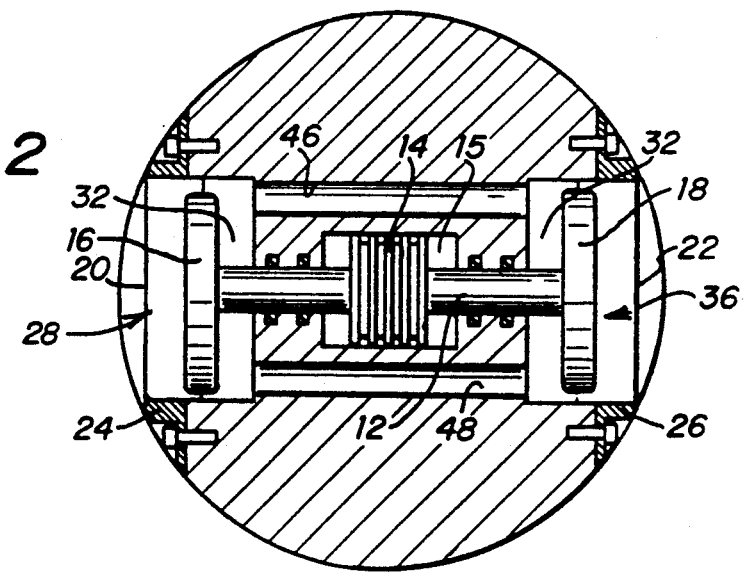
FIG. 2 is a cross-sectional view taken along line A—A of the seismic shear wave generator of FIG. 1.

In operation, a configuration, such as that illustrated in FIGS. 1 and 2, uses a piston 14 and rolling diaphragm 20 and 22 assembly as the vibrating dipole element. An electrohydraulic servovalve 34 with its associated manifold block 35 alternately directs fluid to and away from opposing sides of piston 14 contained within cylindrical cavity 15. Piston 14, rod 12, and rolling diaphragms 20 and 22 all move in unison. As rolling diaphragm 20 and 22 assembly moves to the right, fluid pressure on the face of right diaphragm 22 increases, while that on the face of left diaphragm 20 decreases. As the assembly moves left, the opposite effect occurs. In the preferred embodiment, rolling diaphragms 20 and 22 are made of a fiber reinforced elastomer, however, any similar substance may be used.

As illustrated in the cross sectional view of FIG. 2, the portions of cavities 28 and 30 interior to rolling diaphragms 20 and 22 are filled with a high bulk modulus, low viscosity, non-electrical conducting oil 32 to prevent wellbore pressure from rupturing diaphragms 20 and 22. Passageways 46 and 48 between cavities 28 and 30 allow internal pressure equalization and piston motion.

Piston displacement is sensed by the eddy current transducer target configuration shown in FIG. 1. The metal target has sloping flat faces parallel to eddy current transducers 42 and 44 sensing faces. As the target moves laterally, one face draws closer to its sensor, while the other face moves away. The two eddy current transducers 42 and 44 are connected in an instrument bridge. The signal generated by the eddy current transducer system is used in the feedback controller for servovalve 34.

Figure 3:
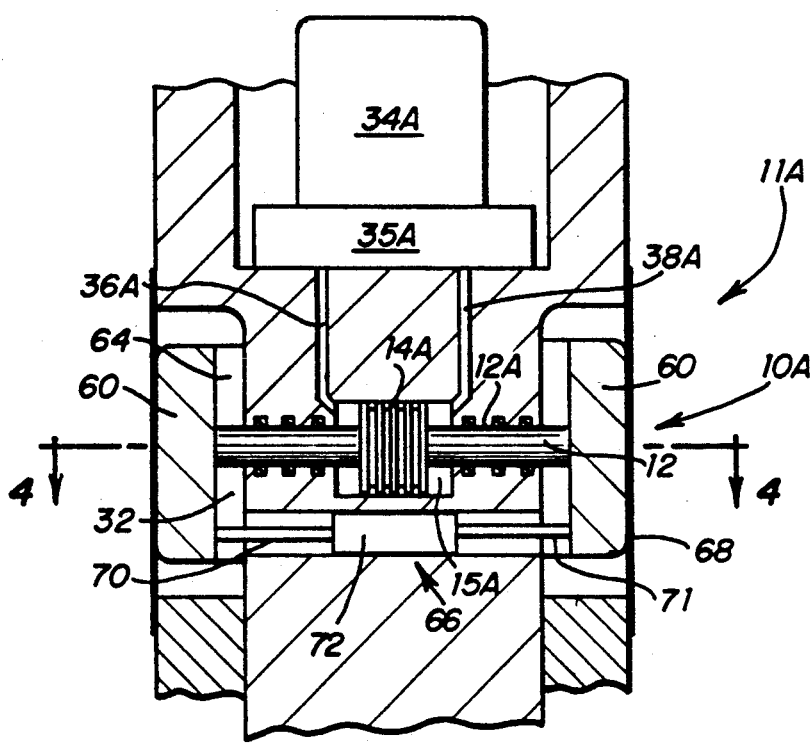
FIG. 3 is a sectional view of a second embodiment of a seismic shear wave generator having a piston and a light weight ring assembly as the vibrating dipole element.
Figure 4:
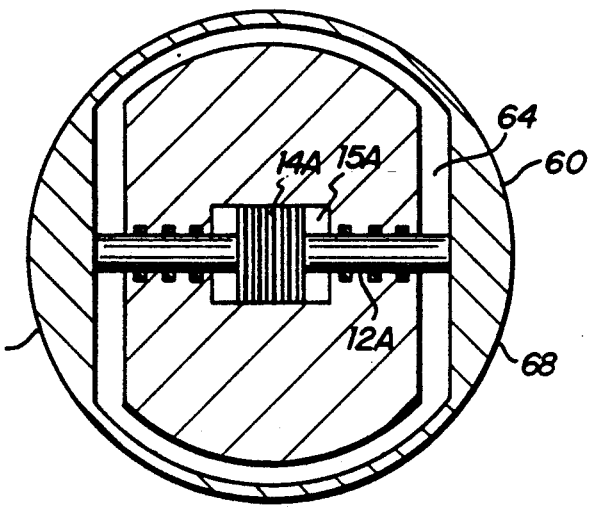
FIG. 4 is a cross-sectional view taken along line A—A of the seismic shear wave generator of FIG. 3.

In a second embodiment, illustrated in FIG. 3 and associated cross sectional view FIG. 4, a continuous vibrator ring 60 replaces diaphragms 20 and 22 and a linear variable differential transformer 62 (LVDT) replaces eddy current transducers 42 and 44 as the feedback signal generator. The concept shown in FIG. 3 is similar to that of FIG. 1, with the above noted differences. Otherwise, operation is the same as the apparatus of FIG. 1.

The present invention as illustrated in FIG. 3, is for a downhole seismic shear wave source 10A, similar to that illustrated in FIG. 1, as part of a downhole tool 11A. A double headed piston rod 12A with a third center piston 14A in a center cavity 15A on the center of rod 12A slides laterally in a downhole tool 11A. Each end of piston rod 12A is connected to a vibrating ring 60. On the inside of vibrating ring 60 is a cavity 64. Cavity 64 is filled with a low viscosity non-conducting oil 32. A servovalve 34A is connected to opposite sides of center piston 14A through manifold 35A feeding flow passages 36A and 38A to produce low frequency vibration by seismic shear wave source 10A. A linear variable differential transformer 66 is provided to monitor movement of vibrating ring 60 and to provide feedback control to servovalve 34. An elastomer band or sleeve 68 extends above and below cavity 64. Sleeve 68 allows movement of ring 60 while containing oil 32 in cavity 64. Linear variable differential transformer stems 70 and 71 connect to linear variable differential transformer core 72 at their inner ends and to ring 60 at their outer ends. Core 72 slides inside linear variable differential transformer 66 actually monitoring movement of vibrating ring 60 and providing the above mentioned feedback control to servovalve 34A.

In operation, a configuration, such as that illustrated in FIGS. 3 and 4, uses a piston 14A with a vibrating ring 60 as the vibrating dipole element. An electro-hydraulic servovalve 34A with its associated manifold block 35A alternately directs fluid to and away from opposing sides of piston 14A through flow passages 36A and 38A. Piston 14A, rod 12A and vibrating ring 60 move in unison.

As illustrated in the cross sectional view of FIG. 4, ring element 60 may be more effective than the arrangement of diaphragms 20 and 22 for inducing shear action in the borehole walls. Also, if two separate vibrating rings 60 are stacked close together, vibrate at right angles to each other and operated ninety degrees out of phase, elliptically polarized shear waves can be generated. Since the stacked spacing would be quite small compared to the seismic wavelength, two or more rings 60 would behave like a single orbiting ring. The stacked ring concept could also allow separate, sequential vibrations. That is, one ring would vibrate through a sweep and then the second ring would vibrate at right angles to the first ring with a similar sweep.

Strong shear wave signal generators may provide a superior shear wave logging tool since the shear disturbance extends further into the formation Also, such generators may be needed for cross-hole testing and for a downhole lateral seismic tool.

Numerous modes of operation are possible with the present invention. In one mode of operation, the sweep frequency may be varied over a wide range. The transducer is swept up or down through a wide frequency range similar to the manner that can be accomplished when Vibroseis is used. Signals recorded at uphole or downhole spaced receivers are then cross correlated with the sweep signal to measure travel times.

In a second mode of operation, phase measurements can be controlled to aid in the determination of wave velocity. The transducers are swept through a narrow frequency range or run at a constant frequency and phase measurements made at receivers to determine velocity.

In a third mode of operation, the present invention may be operated using a fixed phase with an adjustable frequency. Frequency is adjusted by an automatic control system to maintain a predetermined fixed phase difference between signals received at vertically spaced receivers as the tool moves continuously uphole.

In a fourth mode of operation, two vertically spaced parallel transducers may be operated one hundred eighty degrees out of phase to produce vertical shear waves around the borehole.

As has been described, the present invention permits the generation of low frequency seismic shear waves that have substantial amplitude. Thus the present invention can be used downhole to generate low frequency shear waves that are compatible with surface generated seismic waves. Furthermore, the present invention can be used to generate shear waves of an amplitude great enough to be used easily in crosshole testing.

While there has been illustrated and described a particular embodiment of the present invention, it will be appreciated that this description is by way of illustration only and numerous changes and modifications will occur to those skilled in the art. It is intended in the appended claims to cover all those changes and modifications which fall within the true spirit and scope of the present invention.

What is claimed is:

1. A seismic shear wave source associated with a downhole tool used to generate seismic shear waves in a downhole environment comprising:
    double headed piston rod having an end piston head on each end with a third piston on the center of the rod to slide laterally in the downhole tool;
    a rolling diaphragm connected to each of said end piston heads, said rolling diaphragm being secured at its edges around the periphery of a piston receiving cavity filled with a low viscosity non-conducting oil;
    servovalve connected to opposite sides of said third piston to produce low frequency vibration of said rolling diaphragm; and
    a pair of eddy current transducers to monitor movement of said rolling diaphragm and to provide feedback control to said servovalve.

2. The seismic shear wave source according to claim 1 also including:
    a second double headed piston rod having an end piston head on each end with a fourth piston on the center of the rod to slide laterally in the downhole tool;
    a second rolling diaphragm connected to each of said end piston heads of said second double headed piston, said second rolling diaphragm being secured at its edges around the periphery of a second piston receiving cavity filled with a low viscosity non-conducting oil;
    a second servovalve connected to opposite sides of said fourth piston head to produce low frequency vibration of said second rolling diaphragm; and
    a second pair of eddy current transducers to monitor movement of said second rolling diaphragm and to provide feedback control to said second servovalve.

3. The seismic shear wave source according to claim 2, wherein the second double headed piston rod is oriented ninety degrees about the vertical centerline of the tool with respect to the first double headed piston rod such that the two rings vibrate at right angles to each other.

4. The seismic shear wave source according to claim 2, wherein the second double headed piston rod is parallel to the first double headed piston rod.

5. A seismic shear wave source associated with a downhole tool used to generate seismic shear waves in a downhole environment comprising:
    double headed piston rod having an end piston at each end;
    third piston located on the center of said rod to slide laterally in the downhole tool;
    continuous vibrator ring connected to said each end piston head, said vibrator ring being secured at its edges around the periphery of a piston receiving cavity filled with a low viscosity non-conducting oil;
    servovalve connected to opposite sides of said third piston to produce low frequency vibration of said vibrator ring; and a linear variable differential transformer to monitor movement of said vibrator ring and to provide feedback control to said servovalve.

6. The apparatus according to claim 5, also including:

a second double headed piston rod having an end piston at each end;

another third piston located on the center of said second double headed piston rod to slide laterally in the downhole tool;

a second continuous vibrator ring connected to both said end piston heads of said second double headed piston rod, said second vibrator ring being secured at its edges around the periphery of a second piston receiving cavity filled with a low viscosity non-conducting oil;

second servovalve connected to opposite sides of said third piston to produce low frequency vibration of said second vibrator ring; and a linear variable differential transformer to monitor movement of said second vibrator ring and to provide feedback control to said second servovalve.

7. The apparatus according to claim 6, wherein the second double headed piston rod is oriented ninety degrees about the vertical centerline of the tool with respect to the first double headed piston rod such that the two rings vibrate at right angles to each other.

8. The apparatus according to claim 6, wherein the second double headed piston rod is parallel to the first double headed piston rod.

9. A method for generating seismic shear waves with a downhole tool in a downhole environment comprising the steps of:

providing a double headed piston rod having an end piston head on each end with a third piston on the center of the rod to slide laterally in the downhole tool;

connecting rolling diaphragms to each of said end piston heads;

securing each said rolling diaphragm at its edges around the periphery of a piston receiving cavity filled with a low viscosity non-conducting oil;

producing low frequency vibration of said rolling diaphragm by connecting a servovalve to opposite sides of said third piston; and monitoring movement of said rolling diaphragm by a pair of eddy current transducers to provide feedback control to said servovalve.

* * * * *